May 29, 1934. H. E. DOERR 1,960,301
WHEEL
Filed May 13, 1932 2 Sheets-Sheet 1
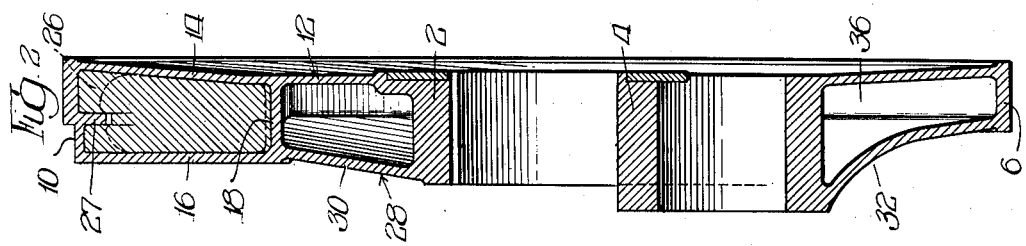
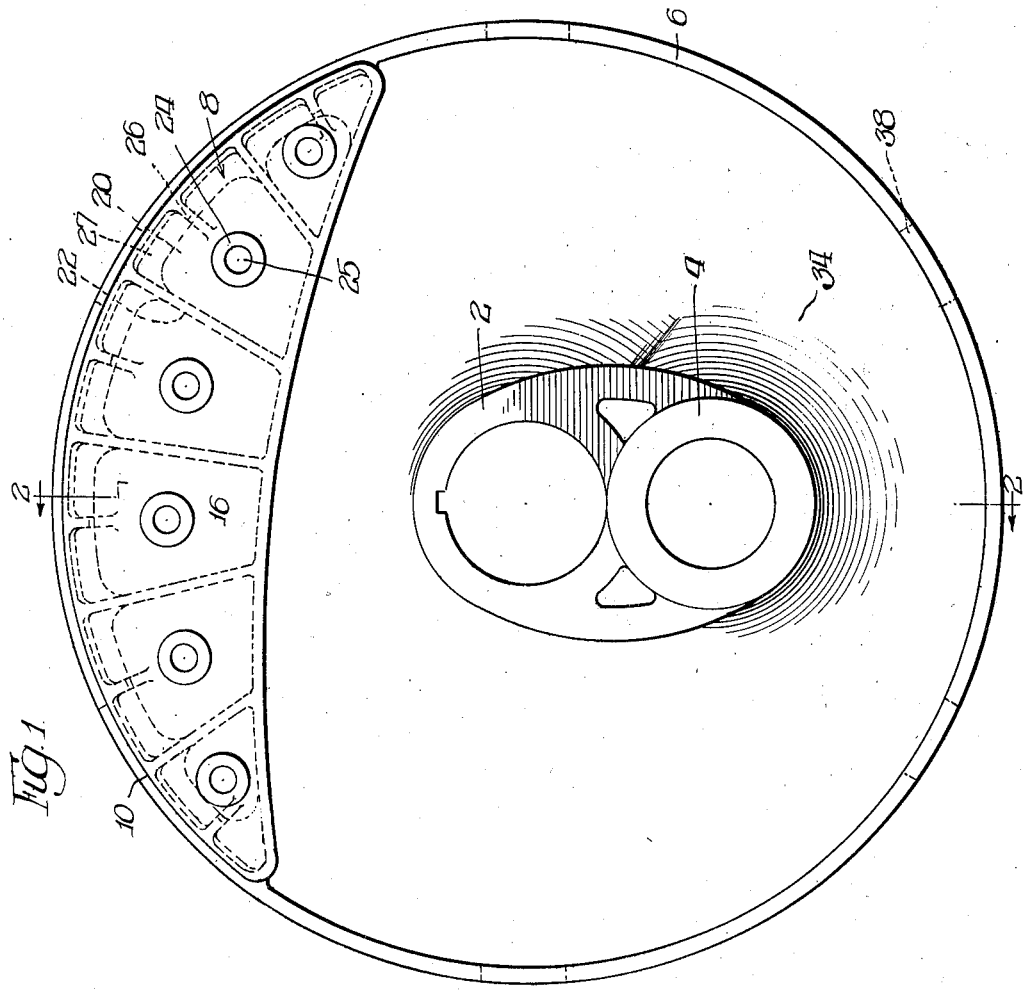
Inventor:
Harry E. Doerr,
By Wilkinson, Huxley, Byron & Knight
Attys.

May 29, 1934.  H. E. DOERR  1,960,301
WHEEL
Filed May 13, 1932   2 Sheets-Sheet 2
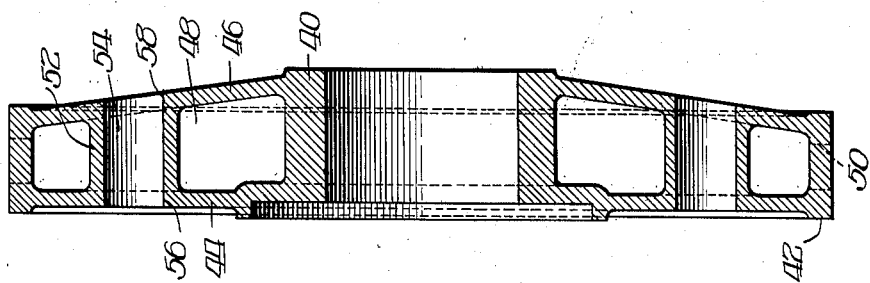
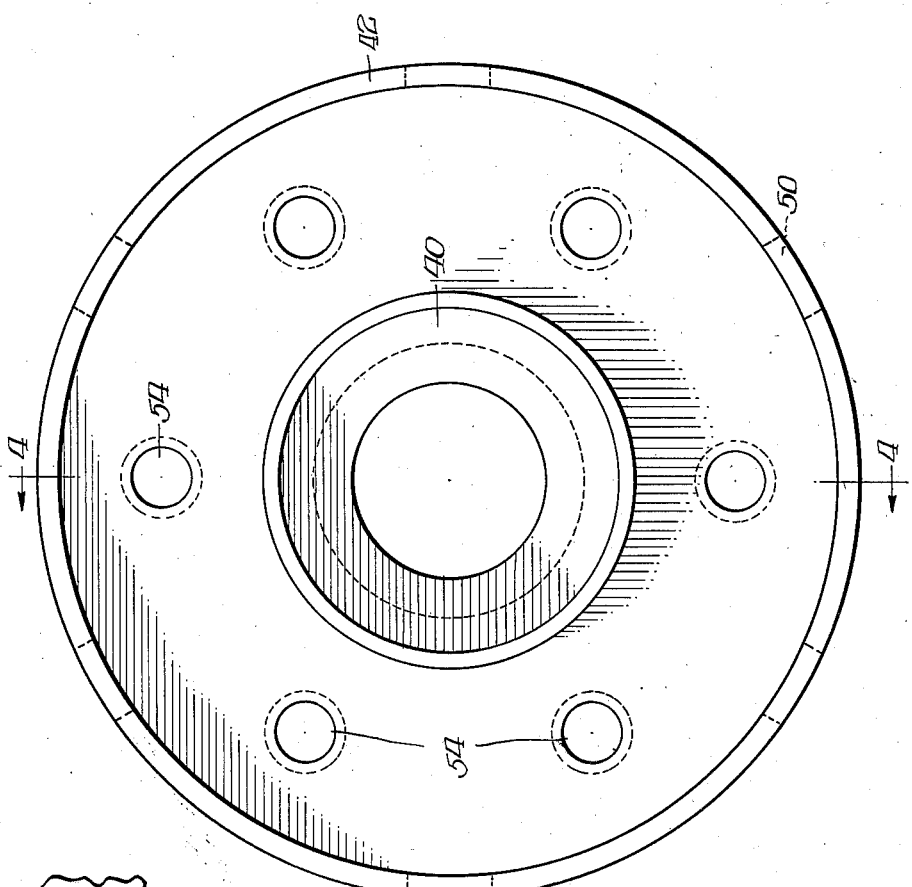
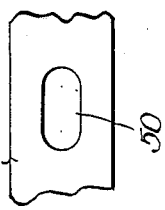
Inventor:
Harry E. Doerr, Patented May 29, 1934

1,960,301

UNITED STATES PATENT OFFICE 1,960,301

WHEEL

Harry E. Doerr, St. Louis, Mo.

Application May 13, 1932, Serial No. 611,089

42 Claims. (Cl. 295—6)

The present invention relates to wheels and more in particular to wheels for cars or the like.

Among the objects of the present invention is to provide a novel wheel for a car or the like in which the hub and rim portions thereof are integrally connected by means of spaced webs.

Another object of the present invention is to provide a novel wheel for a car or the like, in which the hub and rim portions are integrally connected by means of spaced webs forming an interior compartment, the core forming material for forming this compartment being removed as by means of openings formed in the rim portion.

Still another object of the present invention is to provide a novel wheel for a car or the like in which spaced webs are provided and extend between hub and rim portions so as to provide a finished wheel which acts as a truss member under load, it having been found that increased strength in a wheel of this kind may be attained by this construction with greatly reduced amounts of material, thus decreasing the cost of the finished product.

The present invention also contemplates the idea of providing a novel wheel for a locomotive or the like, which includes a main and crank pin hub, the latter of which extends outwardly beyond the end of the main hub, spaced webs being provided in this construction and having portions extending to and terminating with these hub portions adjacent their ends.

Another object within the purview of the present invention is to provide a novel wheel construction for a locomotive or the like, which includes a crank pin hub extending beyond the end of the main hub and in which one of the spaced webs provided therein has a portion extending so as to terminate adjacent the end of the main hub and having another portion flaring outwardly to terminate adjacent the end of the extended end of the crank pin hub.

The present invention further includes as an object the idea of providing a novel wheel construction for a car or the like in which the spaced webs extending between the hub and rim portions are provided with openings and are reinforced as by means of members integrally formed with these webs and extending therebetween and having openings coinciding with the openings in these webs, thereby providing a compartment between these webs from which the core forming material therein can be removed as by means of openings in the rim portion.

Other objects, features, capabilities and advantages are comprehended by the invention, as will later appear and as are inherently possessed thereby.

Referring to the drawings:

Figure 1 is a view in elevation of a wheel made in accordance with the present invention;

Figure 2 is a view in cross section taken in a plane represented by line 2—2 of Figure 1 of the drawings;

Figure 3 is a view in elevation of another embodiment made in accordance with the present invention;

Figure 4 is a view in cross section taken in a plane represented by line 4—4 of Figure 3 of the drawings; and Figure 5 is a fragmentary plan view of a portion of the rim disclosing the formation of openings therein.

Referring now more in detail to the drawings, an embodiment selected to illustrate the present invention is disclosed in Figures 1 and 2 as comprising an integrally formed member having a main hub 2, a crank pin hub 4, and a rim portion 6, this crank pin hub 4 extending outwardly beyond the end of the main hub 2, as clearly shown in Figure 2 of the drawings. Adjacent a portion of the rim 6 is a counter-balance pocket generally referred to as 8, which has its outer wall 10 formed as an integral part of the rim 6. Extending between the hub portions 2 and 4 and the rim 6 is a continuous or imperforate web 12 which forms the rear face of the finished wheel, this web 12 likewise having a portion 14 providing the rear wall of the pocket 8.

This counter-balance pocket 8 is further formed with a wall portion 16 extending inwardly from the wall 10 and in spaced relation with the portion 14 of the web 12, and terminates at the outer end of a transverse wall 18 extending between the same and the web 12. This counter-balance pocket 8 is divided into a plurality of compartments, such as the compartment 20, as by means of a plurality of webs 22 which extend radially inwardly from the rim 6 between the walls 14 and 16 forming the pocket, the same terminating in the transversely disposed wall 18 of his counter-balance pocket. The outer wall 16 is formed with a plurality of openings such as the openings 24, each of which communicates with a compartment or chamber 20 formed by the webs 22, whereby access may be gained to the interior of these compartments for removal of the core forming material, while the portion 14 of the web 12 is provided with openings 25 leading into each of the chambers, these openings being threaded to receive a plug for closing the same after some suitable counter-balance material, such as lead or the like, has been introduced into these chambers for properly counter-balancing the wheel. The openings 24 may be closed as by means of a closure plate or the like welded or otherwise secured to the wall 16. This counter-balance pocket 8 is further formed with a plurality of webs or fins 26 extending inwardly from the rim portion 6 and between the walls 14 and 16, the same being substantially centrally disposed in relation to the partitioned webs, such as 22, and also by the webs or fins 27 extending between the webs 22 and normal to the webs 26.

Extending between the main hub 2 and counter-balance pocket 8 and between the hub portions 2 and 4 and the rim portion 6 is a second continuous or imperforate web 28 spaced in relation to the web 12. This web 28 is formed with a portion 30 which is substantially in the shape of a frusto-conical element, and extends inwardly from adjacent the outer edge of the wall 16 and rim portion 6 to terminate adjacent the end of the main hub 2. This continuous web is likewise formed with a portion 32 which extends from adjacent the outer edge of the rim portion 6 and flares outwardly, as clearly shown in Figure 2 of the drawings, to terminate adjacent the outer end of the crank pin hub 4, the portions 30 and 32 of this web 28 merging to form a finished surface substantially along a line represented by the numeral 34, as clearly shown in Figure 1 of the drawings. It will be observed that the webs 12 and 28 are of continuous construction and are spaced to provide an interior chamber 36 defined by the hubs 2 and 4, webs 12 and 28, and the rim 6 and wall 18 of the counter-balance pocket. The core forming material used in forming this wheel is removed as by means of one or more openings 38 formed in the rim 6.

The present embodiment above disclosed and described constitutes a center for a locomotive wheel or the like, and the flanged tread therefor may be shrunk or otherwise secured on the rim portion 6. It is of course understood that the present invention contemplates the idea of forming his flanged tread portion of the finished wheel integral with the rim portion 6, and it is therefore to be understood that "rim portion" as used in the description and set out in the claims, comprehends either the rim portion 6 as shown, or the same integrally formed with a flanged tread portion. Therefore, the term "wheel" as used in the present specification and claims is to be understood in its broadest aspect to comprehend either a wheel center or the entire wheel.

As clearly shown in Figure 2, the continuous web 12 forms the inside face of the finished wheel and is entirely disposed within the plane of the wheel, that is, the same is inwardly of the inside edge of the rim 6, while it will be clearly seen that the web 28 spaced therefrom extends from adjacent the outside edge of the rim to terminate in the hubs 2 and 4 in a plane or planes beyond the plane of the outside edge of the rim portion 6. Because of this construction, the inside web 12 is subjected to compressive stresses, while the outside web 28 is subjected to tensile stresses. The wheel therefore acts as a truss member, the inside or rear web 12 acting as a chord under compression between the rim portion 6, and the front disc or web 28 serving as a chord member under tension. It will therefore be seen that under such conditions, the required strength of the wheel for a locomotive or the like may be secured with a minimum of material, thereby reducing the cost of the finished product to a great extent.

Referring to Figures 3 to 5 inclusive, another embodiment selected to illustrate the present invention is disclosed therein as comprising an integrally formed member having a hub portion 40 and a rim portion 42, between which extends spaced webs or discs 44 and 46, the web 44 extending between the hub 40 and rim portion 42 in a substantially normal direction to the rim portion 42, while the web or disc 46 extends from the rim portion 42 to a point adjacent the outer end of the hub 40, and is frustro-conical in shape, the same being angularly disposed in relation to the web or disc 44.

In this embodiment, as in the hereinbefore disclosed embodiment, the webs 44 and 46 provide an interior chamber or compartment 48 which extends between the hub portion 40 and the rim portion 42, the core forming material used in forming the wheel being removed from this chamber or compartment 48 as by means of one or more openings 50 provided in the rim portion 42, and which may be elongated, as clearly shown in Figure 5.

In order to provide a wheel of increased strength, the webs 44 and 46 are reinforced by substantially cylindrical walls 52 which are formed integral with the webs 44 and 46 and extend therebetween, this substantially cylindrical wall 52 being provided with an opening 54 coinciding with openings 56 and 58 provided in the webs 44 and 46, respectively.

As previously pointed out, the present embodiment shown in Figures 3 and 4 of the drawings constitutes a wheel center and a rim portion 42 on which a tread or flanged tread portion may be shrunk or otherwise secured. However, the present invention contemplates the idea of forming this tread portion integral with the rim portion 42, and it is to be understood that the term "wheel" refers to either of these two constructions, and that the term "rim portion" is sufficiently broad to comprehend the inclusion of a tread portion.

In this embodiment, the web 44 is within the plane of the wheel, that is, outwardly beyond the inside edge of the rim portion 42, and the web 46 extends from adjacent the outside edge of the rim portion to terminate in the hub portion 40 beyond the plane of the outside edge of the rim portion 42. The various parts of the wheel shown in Figures 3 and 4 are therefore subjected to the same forces as the corresponding elements in the embodiments shown in Figures 1 and 2 of the drawings, and under these conditions, a wheel of the required strength may be secured with a minimum of material, thereby greatly reducing the cost of the finished product.

While I have herein described and upon the drawings shown illustrative embodiments of the invention, it is to be understood that the invention is not limited thereto, but may comprehend other constructions, arrangements of parts, details and features without departing from the spirit of the invention.

I claim:

1. A wheel for a locomotive or the like, comprising a member having a main and crank pin hub, a counter-balance portion, a rim portion, spaced imperforate webs extending between said main hub and counter-balance portion and between said hub portions and rim portion and providing an interior compartment, said rim portion having a plurality of openings communicating with said compartment for removal of core forming material therefrom.

2. A wheel for a locomotive or the like, comprising a rim portion, a main and crank pin hub, an imperforate web extending between said hubs and rim portion and forming the inside face of said wheel, said web being within the plane of said wheel and outwardly of the plane of the inside edge of said rim portion, and an imperforate web spaced from said first named web, said web extending between said hubs and rim portion and providing an interior compartment therewith, said rim portion having a plurality of openings therein for removal of core forming material therefrom.

3. A wheel for a locomotive or the like, comprising a rim portion, a counter-balance pocket, a main and crank pin hub, an imperforate web extending between said hubs and rim portion and forming a wall for said pocket, said web forming the inside face of said wheel and being within the plane thereof and outwardly of the plane of the inside edge of said rim portion, and an imperforate web spaced from said first named web and extending between said main hub and pocket and hub portions and rim portion, said last named web forming a compartment with said first named web and terminating with said hub portions outwardly of the plane of the outside edge of said rim portion, said rim portion having a plurality of openings for removal of core forming material from said compartment.

4. A wheel for a locomotive or the like, comprising an integrally formed member having a rim portion, a counter-balance portion, a main and crank pin hub, and continuous webs extending in spaced relation throughout their entire width between said main hub and counter-balance portion and between said hubs and rim portion, said webs terminating in said rim and counter-balance portions and hubs in spaced relation.

5. A wheel for a locomotive or the like, comprising an integrally formed member having a rim portion, a counter-balance portion, a main and crank pin hub, and continuous webs extending in spaced relation throughout their entire width between said main hub and counter-balance portion and between said hubs and rim portion, one of said webs being angularly disposed in relation to the other, said webs terminating in said rim and counter-balance portions and hubs in spaced relation.

6. A wheel for a locomotive or the like, comprising an integrally formed member having a rim portion, a counter-balance pocket, a main and crank pin hub, a continuous web extending between said hubs and rim portion and forming a wall for said pocket, and a continuous web spaced from said first named web and extending between said main hub and pocket and between said hubs and rim portion, said last named web terminating in said pocket in spaced relation to said first-named web.

7. A wheel for a locomotive or the like, comprising an integrally formed member having a rim portion, a counter-balance pocket, a main and crank pin hub, a continuous web extending between said hubs and rim portion and forming a wall for said pocket, and a continuous web spaced from said first named web and extending between said main hub and pocket and between said hubs and rim portion, said last named web being angularly disposed in relation to the first named web, said last named web terminating in said pocket in spaced relation to said first-named web.

8. A wheel for a locomotive or the like, comprising a rim portion, a main and crank pin hub, a continuous web extending between said hubs and rim portion and being in the plane of said wheel and terminating with said hubs outwardly of the plane of the inside edge of said rim portion, and a continuous web spaced from said first named web and extending from said rim portion to terminate in said hubs outwardly beyond the plane of the outside edge of said rim portion.

9. A wheel for a locomotive or the like, comprising a rim portion, a counter-balance pocket, a main and crank pin hub, said hubs having their inside end within the plane of said wheel, a continuous web extending from adjacent the inside edge of said rim portion and terminating with said hubs adjacent their inside end, said hubs having their outer end extending beyond the plane of the outside edge of said rim portion, and a continuous web spaced from said first named web and extending from said rim portion and counter-balance portion to terminate in said hubs outwardly beyond the plane of the outside edge of said rim portion.

10. A wheel for a locomotive or the like, comprising a rim portion, a main and crank pin hub, said crank pin hub extending outwardly beyond said main hub, a web extending between said rim portion and hubs and forming the inside face of said wheel, and a web extending between said rim portion and hubs and forming the outside face of said wheel, said last named web having a part terminating in said crank pin hub outwardly beyond the end of said main hub.

11. A wheel for a locomotive or the like, comprising a rim portion, a main and crank pin hub, said crank pin hub extending outwardly beyond said main hub, a continuous web extending between said rim portion and hubs and forming the inside face of said wheel, and a continuous web extending between said rim portion and hubs and forming the outside face of said wheel, said last named web having a part terminating in said crank pin hub outwardly beyond the end of said main hub.

12. A wheel for a locomotive or the like, comprising a rim portion, a counter-balance portion, a main and crank pin hub, said crank pin hub extending outwardly beyond said main hub, a web extending between said hubs and rim portion and forming the inside face for said wheel, and a web spaced from said first named web and extending between said main hub and counter-balance portion and between said hubs and rim portion to form the outside face of said wheel, said last named web having a part terminating in said crank pin hub outwardly beyond the end of said main hub.

13. A wheel for a locomotive or the like, comprising a rim portion, a counter-balance portion, a main and crank pin hub, said crank pin hub extending outwardly beyond said main hub, a web extending between said hubs and rim portion and forming the inside face for said wheel, and a web spaced from said first named web and extending between said main hub and counter-balance portion and between said hubs and rim portion to form the outside face of said wheel, said last named web being angularly disposed in relation to said first named web and having a part extending from said rim portion and flaring outwardly to terminate in said crank pin hub outwardly beyond the end of said main hub.

14. A wheel for a car or the like, comprising a rim portion, a hub portion, spaced substantially continuous webs extending between said portions, the distance between said webs increasingly varying from said rim to said hub portion, one of said webs being substantially normal to said hub portion, said webs being formed with aligned openings, and reinforcing members extending between said webs and having an opening coinciding with said aligned openings, said rim portion having openings for removal of core forming material from between said webs.

15. A wheel for a car or the like, comprising an integrally formed member having a rim portion, a hub portion, spaced substantially continuous webs extending between said portions, the distance between said webs increasingly varying from said rim to said hub portion, one of said webs being substantially normal to said hub portion, said wheel having openings therethrough and having walls extending between said webs, said rim portion having openings for removal of core forming material from between said webs.

16. A wheel for a locomotive or the like, comprising a rim portion, a main and crank pin hub, said crank pin hub extending beyond said main hub, and spaced webs extending between said rim and hub portions.

17. A wheel for a locomotive or the like, comprising a rim portion, a main and crank pin hub, said crank pin hub extending beyond said main hub, and spaced webs extending between said rim and hub portions, one of said webs terminating in said hub portions in axially spaced relation.

18. A wheel for a car or the like, comprising an integrally formed member having a rim portion, a hub portion, and spaced continuous plane webs extending between said hub and rim portions, one of said webs being substantially normal to said portions and forming the inside face of said wheel, and the other of said webs being angularly disposed in relation to the other and forming the outside face of said wheel.

19. A wheel for a car or the like, comprising an integrally formed member having a rim portion, a hub portion, and spaced continuous plane webs extending between said hub and rim portions, one of said webs being substantially normal to said portions and forming the inside face of said wheel, and the other of said webs being at an increasingly varying distance from the other toward said hub portion and forming the outside face of said wheel.

20. A wheel for a locomotive or the like, comprising a rim portion, a main and crank pin hub, said crank pin hub extending beyond said main hub, and spaced webs extending between said rim and hub portions, one of said webs having a portion flaring outwardly to terminate in said crank pin hub in axially spaced relation with the termination of other portions thereof with said main hub.

21. A wheel for a locomotive or the like, comprising a rim portion, a main and crank pin hub, said crank pin hub extending beyond said main hub, and spaced webs extending between said rim and hub portions, one of said webs having a portion extending between said rim and hub portions in angular relation to the other of said webs and a portion extending between said rim and terminating in said crank pin hub portion in axially spaced relation with the termination of said other portion with said main hub.

22. A wheel for a locomotive or the like, comprising a rim portion, a main and crank pin hub, said crank pin hub extending beyond said main hub, and spaced webs extending between said rim and hub portions, one of said webs having a portion extending between said rim and hub portions in angular relation to the other of said webs and a portion flaring outwardly from the other of said webs and terminating in said crank pin hub portion in axially spaced relation with the terminating of said other portion with said main hub.

23. A wheel for a locomotive or the like, comprising a rim portion, a main and crank pin hub portion, a counter-balance portion, and spaced webs extending between said rim and hub portions and between said counter-balance and main hub portions, one of said webs terminating in said hub portions in axially spaced relation.

24. A wheel for a locomotive or the like, comprising a rim portion, a main and crank pin hub portion, a counter-balance portion, and spaced webs extending between said rim and hub portions and between said counter-balance and main hub portions, one of said webs having a portion terminating in said crank pin hub portion in spaced relation axially with the termination of other portions thereof with said main hub portion.

25. A wheel for a locomotive or the like, comprising a rim portion, a main and crank pin hub portion, a counter-balance portion, and spaced webs extending between said rim and hub portions and between said counter-balance and main hub portions, one of said webs having a portion flaring outwardly and terminating in said crank pin hub portion in spaced axial relation with the termination of other portions thereof with said main hub portion.

26. A wheel for a locomotive or the like, comprising a rim portion, a main and crank pin hub portion, a counter-balance portion, and spaced webs extending between said rim and hub portions and between said counter-balance and main hub portions, one of said webs having a portion extending between said rim and counter-balance portion and main hub portion in angular relation to said other web and another portion flaring outwardly and terminating in said crank pin hub portion in axially spaced relation with the termination of other portions thereof with said main hub portion.

27. A wheel comprising a rim portion, a hub portion, and spaced substantially continuous webs between said portions, one of said webs being plane and the other of said webs flaring away from said first-named web.

28. A wheel comprising a rim portion, a hub portion, and spaced substantially continuous webs between said portions, one of said webs being plane and the other of said webs disposed at an angle with respect to the other of said webs and having a portion flaring away from the same.

29. A wheel for a locomotive or the like, comprising a rim portion, a main and crank pin hub, and spaced webs between said hubs and portion, one of said webs being disposed at an angle to the other and terminating in said main hub and flaring away from said other web to terminate in said crank pin hub.

30. A wheel for a locomotive or the like, comprising a rim portion, a main and crank pin hub, and spaced webs between said hubs and portion, one of said webs flaring away from the other to terminate in said crank pin hub.

31. A wheel comprising a rim portion, a hub portion, and spaced substantially continuous webs between said portions, one of said webs being plane and the other of said webs having a portion disposed at an angle with respect to said first-named web and another portion flaring outwardly with respect to said first-named web.

32. A wheel for a locomotive or the like, comprising a rim portion, a main and crank pin hub, and spaced webs between said portions, one of said webs having a portion disposed at an angle with respect to the other of said webs and terminating in said main hub and another portion flaring outwardly with respect to the other of said webs and terminating in said crank pin hub.

33. A wheel for a locomotive or the like, comprising a rim portion, a counter-balance portion, a main and crank pin hub, and spaced webs between said rim portion and hubs and counter-balance portion and main hub, one of said hubs having a portion between said rim portion and main hub and between said counter-balance portion and main hub angularly disposed in respect to the other of said webs and a portion between said rim portion and crank pin flaring outwardly away from said other web.

34. A wheel for a locomotive or the like, comprising a rim portion, a counter-balance portion, a main and crank pin hub, and spaced webs between said rim portion and hubs and counter-balance portion and main hub, one of said webs having a portion between said rim portion and main hub and between said counter-balance portion and main hub angularly disposed in respect to the other of said webs and a portion between said rim portion and crank pin flaring outwardly away from said other web, said web portions terminating in said main and crank pin hubs in axially spaced relation.

35. A wheel for a locomotive or the like, comprising a member formed with a rim portion, a main and crank pin hub, spaced imperforate webs extending between said hubs and rim portion, and a wall disposed between said webs, said wall, webs and rim portion forming a counter-balance portion for receiving counter-balancing material.

36. A wheel for a locomotive or the like, comprising a member formed with a rim portion, a main and crank pin hub, spaced imperforate webs extending between said hubs and rim portion, and a wall extending between said webs and oppositely disposed parts of said rim portion to provide a counter-balance portion for receiving counterbalancing material.

37. A wheel for a locomotive or the like, comprising a member formed with a rim portion, a main and crank pin hub, a counter-balance portion disposed between said rim and main hub, and spaced imperforate webs between said main hub and counter-balance portion and between said hubs and rim portion, said webs being connected to said counter-balance portion and hubs in spaced relation and being in spaced relation throughout their entire width.

38. A wheel for a locomotive or the like, comprising a member formed with a rim portion, a main and crank pin hub, a counter-balance pocket disposed between said rim and main hub, said pocket being formed in part by a portion of said rim and an oppositely disposed wall and spaced webs connecting said rim and wall, and spaced imperforate webs between said main hub and wall of said counter-balance pocket and between said hubs and rim portion, said webs being connected to said counter-balance portion in spaced relation.

39. A wheel for a locomotive or the like, comprising a member formed with a rim portion, a main and crank pin hub, a counter-balance portion disposed between said rim portion and main hub, and spaced imperforate webs between said main hub and counter-balance portion and between said hubs and rim portion, said webs being connected to said counter-balance and main and crank-pin hubs in spaced relation.

40. A wheel for a locomotive or the like, comprising a member formed with a rim portion, a main and crank pin hub, a counter-balance portion disposed between said rim portion and main hub, and spaced imperforate webs between said main hub and counter-balance portion and between said hubs and rim portion, said webs terminating in said main and crank-pin hubs in spaced relation.

41. A wheel for a locomotive or the like, comprising a member formed with a rim portion, a main and crank pin hub, a counter-balance portion disposed between said rim portion and main hub, and spaced imperforate webs between said main hub and counter-balance portion and between said hubs and rim portion, said webs being disposed in spaced relation to provide a cavity extending radially between said hubs and rim portion and between said main hub and counter-balance portion.

42. A wheel for a locomotive or the like, comprising a member formed with a rim portion, a main and crank pin hub, a counter-balance portion disposed between said rim portion and main hub, and spaced imperforate webs between said main hub and counter-balance portion and between said hubs and rim portion, said webs being in spaced relation throughout their entire width between said counter-balance portion and main hub.

HARRY E. DOERR.